(12) United States Patent
Kim et al.

(10) Patent No.: US 11,112,652 B2
(45) Date of Patent: Sep. 7, 2021

(54) BACKLIGHT UNIT AND DISPLAY DEVICE INCLUDING THE SAME TECHNICAL FIELD

(71) Applicant: LG Display Co., Ltd., Seoul (KR)

(72) Inventors: Donghwi Kim, Paju-si (KR); KiSeong Kim, Paju-si (KR); HyeokJoon Yoon, Paju-si (KR); SeungJu Gwon, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/702,473

(22) Filed: Dec. 3, 2019

(65) Prior Publication Data
US 2020/0183234 A1 Jun. 11, 2020

(30) Foreign Application Priority Data

Dec. 11, 2018 (KR) .................. 10-2018-0159467
Oct. 28, 2019 (KR) .................. 10-2019-0134625

(51) Int. Cl.
*G02F 1/13357* (2006.01)
*G02F 1/1335* (2006.01)

(52) U.S. Cl.
CPC .. *G02F 1/133611* (2013.01); *G02F 1/133603* (2013.01); *G02F 1/133605* (2013.01); *G02F 1/133606* (2013.01); *G02F 1/133614* (2021.01)

(58) Field of Classification Search
CPC ......... G02F 1/133611; G02F 1/133603; G02F 1/133605; G02F 1/133606
See application file for complete search history.

(56) References Cited

U.S. PATENT DOCUMENTS

| | | |
|---|---|---|
| 7,639,318 B2 | 12/2009 | Takeuchi et al. |
| 8,023,065 B2 | 9/2011 | Epstein et al. |
| 8,107,036 B2 | 1/2012 | Hoshi |

(Continued)

FOREIGN PATENT DOCUMENTS

| | | |
|---|---|---|
| CN | 105319774 A | 2/2016 |
| CN | 106299075 A | 1/2017 |

(Continued)

OTHER PUBLICATIONS

Combined Search and Examination Report, UK Intellectual Property Office Patent Application No. GB1918173.4, dated Jun. 10, 2020, 6 pages.

(Continued)

*Primary Examiner* — Jong-Suk (James) Lee
*Assistant Examiner* — Christopher E Dunay
(74) *Attorney, Agent, or Firm* — Fenwick & West LLP

(57) ABSTRACT

In an embodiment, a backlight unit includes a light-emitting device and lower reflector on a substrate. The lower reflector has a hole that accommodates and exposes the light-emitting device. The lower reflector may have a height greater than a height of the light-emitting device. The backlight unit may include a color resin in the holes and on the light-emitting device. The backlight unit may include a light path modulator above the light emitting device and on the color resin. The light path modulator may have a different refractive index than a refractive index of the color resin to reflect the emitted light at a boundary of the light path modulator and the color resin towards the lower reflector.

35 Claims, 21 Drawing Sheets

(56) References Cited

U.S. PATENT DOCUMENTS

| | | | |
|---|---|---|---|
| 8,403,511 B2* | 3/2013 | Bae | G02B 6/0078 362/97.1 |
| 9,964,804 B2 | 5/2018 | Zeng | |
| 10,168,006 B2 | 1/2019 | Chang et al. | |
| 10,338,433 B2 | 7/2019 | Kurita | |
| 2004/0041165 A1* | 3/2004 | Fukasawa | H01L 33/60 257/99 |
| 2005/0280756 A1* | 12/2005 | Kim | G02F 1/133603 349/114 |
| 2006/0290844 A1 | 12/2006 | Epstein et al. | |
| 2007/0110386 A1* | 5/2007 | Chiang | G02F 1/133606 385/147 |
| 2009/0086508 A1* | 4/2009 | Bierhuizen | G02B 6/0021 362/617 |
| 2009/0097233 A1* | 4/2009 | Ooya | H01L 33/62 362/97.3 |
| 2009/0115936 A1 | 5/2009 | Takeuchi et al. | |
| 2009/0159908 A1* | 6/2009 | David | H01L 33/32 257/95 |
| 2009/0237593 A1 | 9/2009 | Hoshi | |
| 2010/0084668 A1* | 4/2010 | Choi | H01L 25/0756 257/89 |
| 2011/0051412 A1* | 3/2011 | Jeong | G02F 1/133603 362/235 |
| 2016/0363272 A1 | 12/2016 | Chang et al. | |
| 2017/0261812 A1 | 9/2017 | Zeng | |
| 2018/0341151 A1 | 11/2018 | Kurita | |
| 2019/0194537 A1 | 6/2019 | Sekiguchi et al. | |

FOREIGN PATENT DOCUMENTS

| | | |
|---|---|---|
| CN | 108051951 A | 5/2018 |
| EP | 1919002 A1 | 5/2008 |
| EP | 3561583 A1 | 10/2019 |
| KR | 10-2010-0086692 A | 8/2010 |
| TW | 200704973 A | 2/2007 |
| TW | 201314865 A | 4/2013 |
| TW | 201431114 A | 8/2014 |
| TW | 201643342 A | 12/2016 |
| WO | WO 2007/007582 A1 | 1/2007 |
| WO | WO 2018/043237 A1 | 3/2018 |

OTHER PUBLICATIONS

Office Action, Taiwan Intellectual Property Office Patent Application No. 108143987, dated Sep. 11, 2020, 13 pages.

Examination Report, UK Intellectual Property Office Patent Application No. GB1918173.4, dated Feb. 9, 2021, four pages.

Office Action, Taiwan Intellectual Property Office Patent Application No. TW108143987, dated Feb. 24, 2021, thirty-two pages.

* cited by examiner

BACKLIGHT UNIT AND DISPLAY DEVICE INCLUDING THE SAME TECHNICAL FIELD

CROSS REFERENCE TO RELATED APPLICATIONS

This application claims priority from Republic of Korea Patent Application No. 10-2018-0159467, filed on Dec. 11, 2018, and Republic of Korean Patent Application No. 10-2019-0134625, filed on Oct. 28, 2019, all of which are hereby incorporated by reference for all purposes as if fully set forth herein.

BACKGROUND

1. Field of the Disclosure

Embodiments disclosed herein relate to a backlight unit and a display device including the same.

2. Description of the Related Art

A liquid crystal display (LCD) is one of flat panel displays for displaying images using a liquid crystal. The LCD is widely used throughout the industry due to the advantages thereof such as thin thickness, light weight, and low power consumption. The LCD is able to display an image by adjusting the transmissivity of light emitted from a backlight unit in accordance with the characteristic thereof that the transmissivity is controlled by changing the arrangement of liquid crystals. Such an LCD uses a light-emitting diode (LED), a cold cathode fluorescent lamp (CCFL), a hot cathode fluorescent lamp (HCLF), or the like as a light source of the backlight unit. In recent years, light-emitting diodes having excellent light efficiency and high color reproducibility have been widely used as light sources for backlight units.

The backlight units may be classified into an edge-type or a direct-type depending on the arrangement of a light source and a light transmission form. In the direct-type backlight unit, a light source such as an LED may be disposed on the rear side of the display device.

The light source device used in such a direct-type backlight unit may include a light-emitting diode, and a substrate on which the light-emitting diode is mounted and which includes a circuit element for driving the light-emitting diode or the like. In addition, a phosphor film including an expensive phosphor may be disposed on the light-emitting diode so that light emitted from the light-emitting device is excited to exhibit a color. However, since a large amount of phosphor is used in the phosphor film, the manufacturing cost of the backlight unit may increase. In addition, when the light emitted from the light-emitting device is not sufficiently excited, color reproductivity is deteriorated.

SUMMARY

Embodiments of the present disclosure provide a backlight unit having a high color reproductivity and a display device including the backlight unit.

In addition, embodiments of the present disclosure provide a backlight unit capable of reducing a manufacturing cost and a display device including the backlight unit.

According to embodiments of the present disclosure, it is possible to provide a backlight unit having a high color reproductivity and a display device including the backlight unit.

According to embodiments of the present disclosure, it is possible to provide a backlight unit capable of reducing a manufacturing cost and a display device including the backlight unit In various embodiments, a backlight unit comprises a substrate; a light-emitting device on the substrate; a lower reflector on the substrate, the lower reflector with a hole that accommodates and exposes the light-emitting device, the lower reflector having a height greater than a height of the light-emitting device and configured to reflect light emitted from the light-emitting device; a color resin in the holes and on the light-emitting device, and having a height lower than the height of the lower reflector; and a light path modulator above the light emitting device and on the color resin, the light path modulator having a different refractive index than a refractive index of the color resin to reflect the emitted light at a boundary of the light path modulator and the color resin towards the lower reflector.

In an embodiment, the color resin includes a plurality of phosphors having at least two different colors. In an embodiment, the color resin has an upper surface that is concave or convex.

In an embodiment, the light path modulator comprises air.

In an embodiment, the backlight unit further comprises a distributed Bragg reflector on the light-emitting device, the distributed Bragg reflector in the hole and between the substrate and the light path modulator.

In an embodiment, the backlight unit further comprises an adhesive film on the lower reflector and the light path modulator, and a light-modifying sheet on the adhesive film, the light-modifying sheet including a plurality of light-modifying patterns at least partially overlapping the plurality of light-emitting devices, the plurality of light-modifying patterns having one or more layers including a top layer on a surface of the light-modifying sheet facing the substrate, air gaps present between the one or more layers and the adhesive film.

In an embodiment, the one or more layers further includes a middle layer on a surface of the top layer facing the substrate, the top layer having a size greater than a size of the middle layer.

In an embodiment, the one or more layers further includes a bottom layer on a surface of the middle layer facing the substrate, the bottom layer having a size less than the size of the middle layer.

In an embodiment, the backlight unit further comprises a phosphor film on the light-modifying sheet, a diffusion plate on the phosphor film, and an optical sheet on the diffusion plate.

In various embodiments, a backlight unit comprises a substrate including a groove having side walls applied with a reflective material and having a first height; a light-emitting device in the groove and having a second height lower than the first height; a color resin in the groove and on the light emitting device, the color resin having a third height lower than the first height; and an light path modulator in the groove and on the color resin, the light path modulator having a refractive index different from a refractive index of the color resin to reflect light emitted from the light-emitting device at a boundary of the light path modulator and the color resin towards the side walls of the grooves.

In various embodiments, a method for manufacturing a backlight unit comprises disposing a plurality of light-emitting devices in areas of a substrate; disposing a lower reflector on the substrate with holes of the lower reflector accommodating and exposing the plurality of light-emitting devices, the holes having a depth greater than a height of the plurality of light-emitting devices; curing a color resin in the holes, the cured resin having a height lower than the depth; and disposing an light path modulator in the holes and on the color resin, the light path modulator having a different refractive index than that of the color resin.

In an embodiment, the method further comprises disposing reflectors on the plurality of light-emitting devices, and coating the substrate with a reflective material.

In an embodiment, the method further comprises disposing an adhesive film on the lower reflector and the light path modulator; and disposing a light-modifying sheet on the adhesive film, the light-modifying sheet including a plurality of light-modifying patterns at least partially overlapping the plurality of light-emitting devices, the plurality of light-modifying patterns having one or more layers including a top layer on a surface of the light-modifying sheet facing the substrate, air gaps present between the one or more layers and the adhesive film.

In an embodiment, the method further comprises printing the top layer on the surface of the light-modifying sheet.

In an embodiment, the method further comprises printing a middle layer of the one or more layers on the top layer, the top layer having an area greater than an area of the middle layer, wherein the light-modifying sheet having the printed top layer and middle layer is reversed before disposing the light-modifying sheet on the adhesive film.

In an embodiment, the method further comprises printing a bottom layer of the one or more layers on the middle layer, the bottom layer having an area less than the area of the middle layer.

In various embodiments, a backlight unit comprises a light-emitting device having a flip chip structure; a first reflector disposed to surround a first area including the light-emitting device and a periphery of the light-emitting device; a color resin disposed in the first area; an adhesive film disposed above the color resin to be spaced apart from the color resin by a predetermined distance; and a light modifying sheet disposed on the adhesive film and including a light modifying pattern disposed to correspond to a position of the light-emitting device.

In an embodiment, the backlight unit further comprises a material disposed between the adhesive film and the color resin and having a refractive index different from a refractive index of the color resin.

In an embodiment, the first reflector has a height higher than a height of the color resin.

In an embodiment, the backlight unit further comprises a substrate including a groove corresponding to the first area, and wherein a reflective film is applied to the substrate.

In an embodiment, the backlight unit further comprises a phosphor film disposed above the light modifying sheet and including a phosphor having a color different from a color of the color resin.

In an embodiment, the color resin comprises two types of phosphors having different colors.

In an embodiment, the backlight unit further comprises a second reflector disposed on an upper face of the light-emitting device.

In various embodiments, a display device comprises a display panel; a backlight unit disposed below the display panel and configured to radiate light to the display panel. The backlight unit comprises a light-emitting device having a flip chip structure; a first reflector disposed to surround a first area including the light-emitting device and a periphery of the light-emitting device; a color resin disposed in the first area; an adhesive film disposed above the color resin to be spaced apart from the color resin by a predetermined distance; and a light modifying sheet disposed on the adhesive film and including a light modifying pattern disposed to correspond to a position of the light-emitting device.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Figure 1:
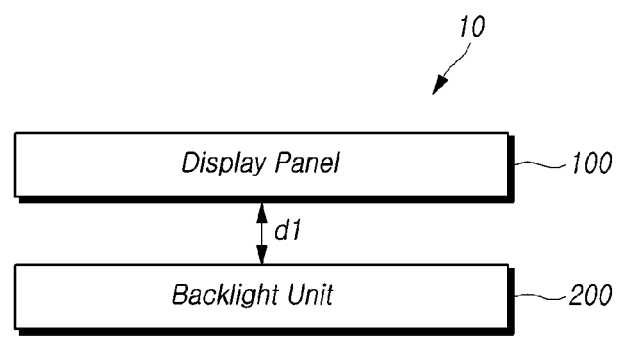
FIG. 1 is a structural diagram illustrating a display device according to an embodiment of the present disclosure.

The advantages and features of the present disclosure and methods of achieving the same will be apparent by referring to embodiments of the present disclosure as described below in detail in conjunction with the accompanying drawings. However, the present disclosure is not limited to the embodiments set forth below, but may be implemented in various different forms. The following embodiments are provided only to completely disclose the present disclosure and inform those skilled in the art of the scope of the present disclosure, and the present disclosure is defined only by the scope of the appended claims.

The shapes, sizes, ratios, angles, numbers, and the like shown in the drawings for explaining embodiments of the present disclosure are illustrative, and therefore the present disclosure is not limited to the shown matters. Throughout the specification, the same or like reference numerals designate the same or like elements. Further, in the description of the present disclosure, when it is determined that the detailed description of the related well-known technologies unnecessarily make the subject matter of the present disclosure unclear, the detailed description will be omitted. When the expression "include", "have", "comprise", or the like as mentioned herein is used, any other part may be added unless the expression "only" is used. When an element is expressed in the singular, the element may cover the plural form unless a special mention is explicitly made of the element.

Further, in interpreting elements in embodiments of the disclosure, they should be construed to cover tolerance ranges even when explicit indications are not given separately.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element. When a positional relationship of two parts is described using, for example, "on ---", "above ---", "below ---", "beside ---", or the like, one or more other parts may be positioned between the two parts unless a term, such as "just" or "directly", is used.

In addition, components in embodiments of the present disclosure are not limited by these terms. These terms are only used to distinguish one component from another. Accordingly, when a constituent element is referred to as a first constituent element hereinafter, it may be a second constituent element within the technical idea of the present disclosure.

In addition, features (components) in embodiments of the present disclosure may be partly or wholly coupled or combined with each other or partly or may be wholly separated from each other, technically various interlocking and driving are possible, and respective embodiments may be implemented independently of each other or may be implemented in conjunction with each other.

Hereinafter, embodiments of the present disclosure will be described in detail with reference to the accompanying drawings.

FIG. 1 is a structural diagram illustrating a display device according to an embodiment of the present disclosure.

Referring to FIG. 1, a display device 10 may include a display panel 100 and a backlight unit 200 configured to radiate light to the display panel 100.

The display panel 100 may be a liquid crystal panel. The liquid crystal panel may include a liquid crystal layer capable of generating a difference in transmissivity according to the arrangement of liquid crystal molecules, a pixel electrode configured to selectively apply a voltage to the liquid crystal layer, and a common electrode configured to apply a common voltage to the liquid crystal layer to correspond to the pixel electrode. The liquid crystal layer may be disposed between the pixel electrode and the common electrode, and the arrangement of the liquid crystal molecules may be determined corresponding to the voltage applied between the pixel electrode and the common electrode. In addition, the display panel 100 may include a color filter. In addition, the display panel 100 may further include a pixel circuit configured to selectively apply a voltage to the pixel electrode, and a drive circuit configured to supply a signal and a voltage to a pixel circuit.

The backlight unit 200 is disposed below the display panel 100 and can uniformly radiate light to at least part of or the entire face of the display panel 100 from below the display panel 100. The backlight unit 200 may generate and radiate light using light-emitting diodes. The backlight unit 200 may be spaced apart from the display panel 100 by a predetermined distance dl.

Figure 2:
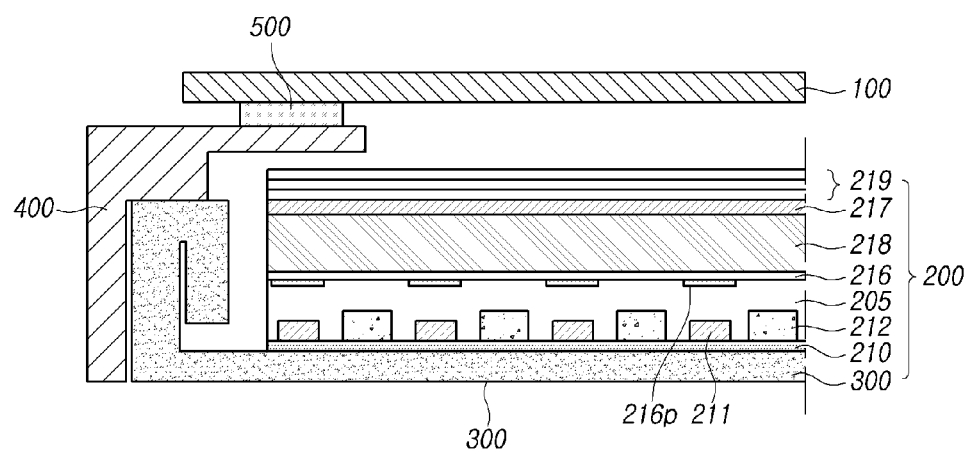
FIG. 2 is a view illustrating an example of the structure of a backlight unit included in a display device according to embodiments of the present disclosure.

FIG. 2 is a view illustrating an example of the structure of a backlight unit included in a display device according to embodiments of the present disclosure.

Referring to FIG. 2, the display device 10 according to the embodiments of the present disclosure may include a display panel 100 and a backlight unit 200 disposed below the display panel 100 and configured to supply light to the display panel 100.

Various structures may be disposed between the backlight unit 200 and the display panel 100. For example, the display panel 100 may be fixed to the backlight unit 200 via a guide panel 400, a foam pad 500, and the like, but the present disclosure is not limited thereto.

The backlight unit 200 may include a cover bottom 300 configured to accommodate optical elements and the like constituting the backlight unit 200.

A substrate 210 may be disposed on the cover bottom 300, and multiple light-emitting devices 211 may be disposed on the substrate 210. The light-emitting devices 211 may be, for example, light-emitting diodes (LEDs), or may be mini LEDs or micro LEDs. In addition, the light-emitting devices 211 may be disposed in the form that chip-type light-emitting devices 211 are mounted on the substrate 210, so that it is possible to reduce the thickness of the backlight unit 200 and it is also possible to provide a light source having a wide radiation angle and high optical efficiency. A light-emitting device 211 configured to be mounted on a substrate 210 may be referred to a light-emitting device 211 having a flip chip structure.

The light-emitting devices 211 may emit light in a white wavelength band or, in some cases, may emit light in a specific wavelength band (e.g., a blue wavelength band). The substrate 210 may be a printed circuit board, and a reflector 212 may be disposed on at least a portion of the area in which the light-emitting devices 211 are not disposed on the substrate 210. A light source protection unit 205 may be disposed on the multiple light-emitting devices 211 and the reflector 212. The light source protection unit 205 may protect the multiple light-emitting devices 211, and may provide a function of diffusing the light emitted from the light-emitting devices 211. The light source protection unit 205 may be a resin layer including a resin.

A light-modifying sheet 216 may be disposed on the light source protection unit 205. The light-modifying sheet 216 may include multiple light-modifying patterns 216p disposed on a face that faces the light-emitting devices 211. Here, the multiple light-modifying patterns 216p may be disposed at positions corresponding to the multiple light-emitting devices 211 on the lower face of the light-modifying sheet 216. The light-modifying patterns 216p may transmit a part of the light emitted from the light emitting element 211. The light modifying sheet 216 may be a light control sheet capable of transmitting a part of light. The light modifying sheet is capable of scattering, reflecting, diffracting, or transmitting from the light-emitting devices 211, thereby improving the image quality of the backlight unit 200.

That is, by arranging the light-modifying patterns 216p in the area where the intensity of the light emitted from the light-emitting devices 211 is highest, it is possible to reduce brightness deviation between the area where the light-emitting devices 211 are disposed (an area having a greater amount of light) and the areas between the light-emitting devices 211 (areas having a smaller amount of light).

The light modifying sheet 216 may include a light modifying material. In addition, the light modifying pattern 216p may include titanium dioxide (TiO$_2$). In addition, the light modifying material may be white. However, it is not limited thereto.

A diffusion plate 218 configured to diffuse light incident from below may be disposed on the light-modifying sheet 216. In addition, a phosphor film 217 or one or more optical sheets 219 may be disposed on the diffusion plate 218. In some embodiments, when the light incident on the phosphor film 217 is blue light, the light passes through the phosphor film 217 may be converted into white light.

FIGS. 3A to 3E are views each illustrating an example of a specific structure of the backlight unit illustrated in FIG. 2.

Figure 3A:
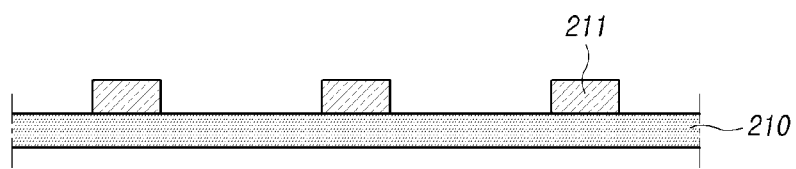
FIGS. 3A, 3B, 3C, 3D, and 3E are views each illustrating an example of a specific structure of the backlight unit illustrated in FIG. 2.

Referring to FIG. 3A, multiple light-emitting devices 211 may be disposed on the substrate 210. A reflective film coated on the substrate 210 may be disposed. The coated reflective film may be formed of a white pigment. That is, a white pigment may be applied to the substrate 210.

Figure 3B:
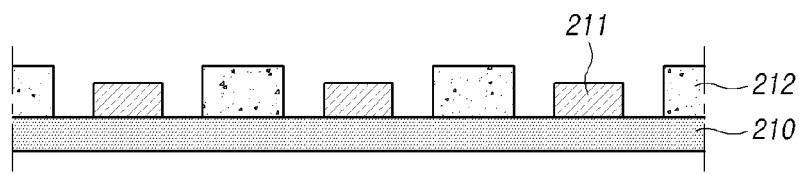

Referring to FIG. 3B, a reflector 212 may be disposed on at least a part of an area, except for the area where the light-emitting devices 211 are disposed on the substrate 210.

The reflector 212 may be disposed in the shape in which areas corresponding to the light-emitting devices 211 are open, and may be disposed on the substrate 210. The reflector 212 is able to reflect the light emitted from the light-emitting devices 211 to the front face of the backlight unit (facing the display panel 100), thereby enhancing the optical efficiency of the backlight unit.

Here, when the light-emitting devices 211 are disposed in the form of chips, the height of the reflector 212 may be greater than the height of the light-emitting devices 211 since the size of the light-emitting devices 211 is small.

Therefore, the light emitted in the lateral directions of the light-emitting devices 211 is able to be reflected by the side faces of the openings in the reflector 212 and may be emitted to the front face of the backlight unit 200, thereby further enhancing the optical efficiency of the backlight unit 200.

Figure 3C:
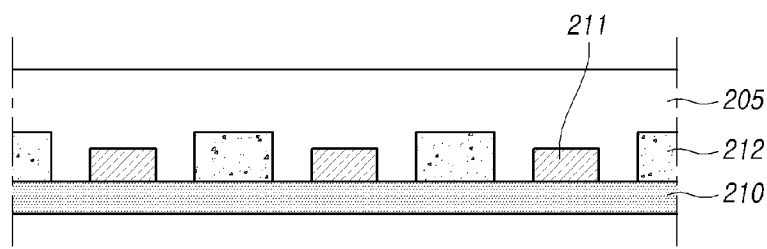

Referring to FIG. 3C, a light source protection unit 205 may be disposed on the multiple light-emitting devices 211 and the reflector 212. The light source protection unit 205 may include, for example, a resin. When the light source protection unit 205 includes a resin, the light source protection unit 205 may be provided by disposing a partition outside the substrate 210 or outside the area in which the multiple light-emitting devices 211 are disposed, and applying the resin inside the partition. The light source protection unit 205 functions to protect the multiple light-emitting devices 211 disposed on the substrate 210, and may provide the function of a light guide plate by diffusing the light emitted from the light-emitting devices 211. The light emitted from the light-emitting devices 211 may spread by the light source protection unit 205 to the upper face of the light source protection unit 205 more evenly. At this time, even if the reflector 212 modifies or adjusts the direction in which the light is spread by the light source protection unit 205 or the like, the intensity of the light emitted in the vertical direction of the light-emitting devices 211 may be high, and thus the uniformity of image may be deteriorated.

According to the embodiments of the present disclosure, it is possible to improve the uniformity of image while reducing the thickness of the backlight unit 200 by disposing light-modifying patterns 216p having an optical characteristic such as scattering, reflection, diffraction, and transmitting at the positions corresponding to the light-emitting devices 211 on the light source protection unit 205.

Figure 3D:
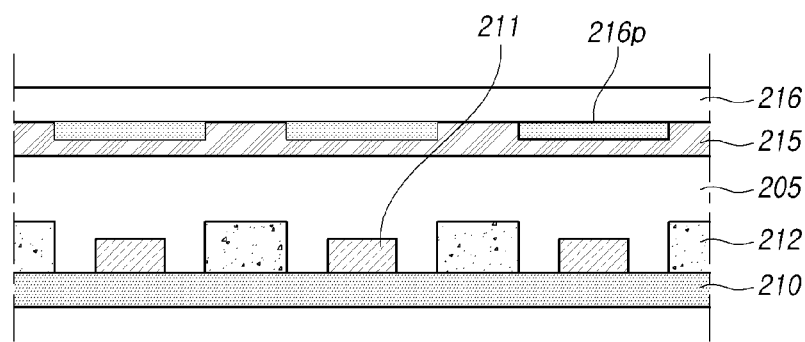

Referring to FIG. 3D, a light-modifying sheet 216 may be disposed on the light source protection unit 205, and the multiple light-modifying patterns 216p may be disposed on the lower surface of the light-modifying sheet 216. However, this disclosure is not limited thereto, and the multiple light-modifying patterns 216p may be disposed on the upper surface of the light-modifying sheet 216. Then, the light-modifying sheet 216 may be bonded to the light source protection unit 215 through a piece of adhesive film 215. The adhesive film 215 may be an OCA film. The light-modifying sheet 216 may be made of, for example, PET or the like, but is not limited thereto. Each of the multiple light-modifying patterns 216p disposed on the lower surface or the upper surface of the light-modifying sheet 216 may be arranged to correspond to one of the multiple light-emitting devices 211 disposed on the substrate 210. For example, the light-modifying patterns 216p may be disposed to at least partially overlap the light-emitting devices 211, in consideration of the light diffusion characteristics, and may be disposed to overlap an area including the area in which the light-emitting devices 211 are disposed. The light-modifying patterns 216p may scatter, reflect, diffract or transmit the light emitted from the light-emitting devices 211. For example, the light-modifying patterns 216p may scatter light emitted from the light-emitting devices 211 so as to allow the light to be emitted from the light-modifying sheet 216. In addition, the light-modifying patterns 216b may reflect the light emitted from the light emitting devices 211 in the vertical direction and may cause the light to be reflected again by the reflector 212, so that the light is emitted to the areas between the light-emitting devices 211 or between the light-modifying patterns 216b.

As described above, the light emitted from the light-emitting devices 211 by the light-modifying patterns 216p may be scattered, reflected, diffracted, or transmitted, it is possible to improve the image quality of the backlight unit 200.

Figure 3E:
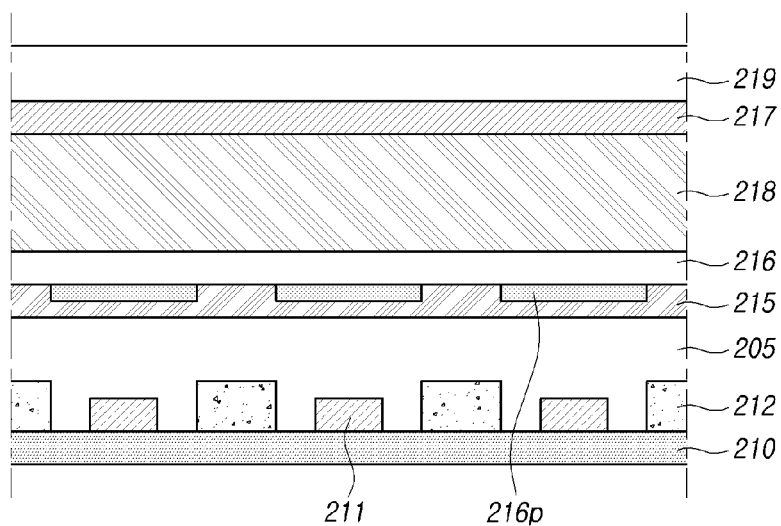

Referring to FIG. 3E, a diffusion plate 218 may be disposed on the light-modifying sheet 216, and a phosphor film 217 may be disposed on the diffusion plate 218. Then, at least one optical sheet 219 may be disposed on the phosphor film 217. Here, the positions where the diffusion plate 218 and the phosphor film 217 are disposed may be mutually exchanged. The diffusion plate 218 can diffuse the light emitted through the light-modifying sheet 216.

The phosphor film 217 may include a phosphor having a specific color, and may excite incident light to emit light in a specific wavelength band. Accordingly, the light passing through the phosphor film 217 may have a specific color included in the phosphor film 217 or a color mixed with the specific color. For example, in the case in which the light-emitting devices 211 emit light in a first wavelength band (e.g., blue light), the phosphor film 217 may emit light in a second wavelength band (e.g., green light) and light in a third wavelength band (e.g., red light) in response to the light incident thereon.

In some cases, the phosphor film 217 may be disposed in a partial area on the diffusion plate 218. For example, when the light-emitting devices 211 emit light in a blue wavelength band, the phosphor film 217 may be disposed only in an area other than an area corresponding to the area in which the blue subpixels SP are arranged in the display panel 100. That is, it is possible to cause light, which has not passed through the phosphor film 217, to reach the blue subpixels SP of the display panel 100. In addition, the phosphor film 217 may not be disposed in the backlight unit 200. For example, when the light-emitting devices 211 emit light in a white wavelength band or are coated with a color conversion film, which emits light in a green wavelength band and light in a red wavelength band, on the emission faces thereof, the phosphor film 217 may not be disposed.

As described above, the embodiments can improve the image quality of the backlight unit while reducing the thickness of the backlight unit by providing the light-modifying sheet 216 including the light-modifying patterns 216p disposed at the positions corresponding to the light-emitting devices 211 and various optical elements.

Hereinafter, embodiments will be described with specific examples of the light-modifying patterns 216p disposed on the light-modifying sheet 216.

Figure 4:
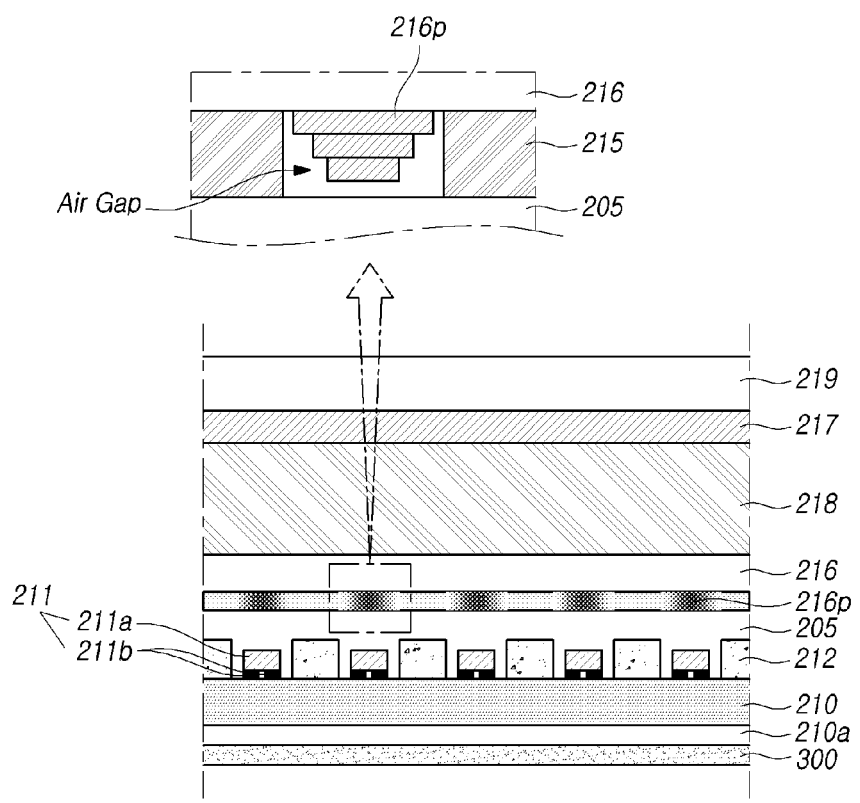
FIG. 4 is a view illustrating a structure of a backlight unit according to embodiments of the present disclosure.

FIG. 4 is a view illustrating a structure of a backlight unit according to embodiments of the present disclosure.

Referring to FIG. 4, a substrate 210 may be disposed on a cover bottom 300 and the substrate 210 may be bonded to the cover bottom 300 by the adhesive tape 210a disposed between the cover bottom 300 and the substrate 210.

Multiple light-emitting devices 211 may be disposed on the substrate 210, and a reflector 212 may be disposed on at least a part of an area other than the area in which the light-emitting devices 211 are disposed on the substrate 211.

Here, each of the light-emitting devices 211 may be, for example, an LED, and may include a light-emitting portion 203a including an n-type semiconductor layer, an activation layer, and a p-type semiconductor layer, and an electrode portion 203b. A light source protection unit 205 is disposed on the multiple light-emitting devices 211 and the reflector 212. A light-modifying sheet 216 on which the light-modifying patterns 216p are disposed at the positions corresponding to the light-emitting devices 211 may be disposed on the light source protection unit 205. Then, a diffusion plate 218, a phosphor film 217, an optical sheet 219, and the like may be disposed on the light-modifying sheet 216.

The light-modifying patterns 216p disposed on the lower face of the light-modifying sheet 216 may be implemented by printing a substance having a light-modifying property on the light-modifying sheet 216. For example, the light-modifying patterns 216p may be disposed through a method of printing ink including titanium dioxide (TiO$_2$) on the light-modifying sheet 216. In addition, the light-modifying patterns 216p disposed on the lower face of the light-modifying sheet 216 may be arranged in one layer, or may be arranged in a multi-layer structure. That is, as illustrated in FIG. 4, the light-modifying patterns 216p disposed on the lower surface of the light-modifying sheet 216 may be configured in three layers. The light-modifying patterns 216p may be implemented through a method of printing the light-modifying substance three times on the light-modifying sheet 216, and the area of the light-modifying substance to be printed may become gradually narrower. Then, the light-modifying patterns 216p may be disposed on the light-emitting devices 211 by reversing and disposing the light-modifying sheet 216, on which the light-modifying patterns 216p are disposed, on the light source protection unit 205.

Therefore, the area of the light-modifying patterns 216p may gradually become narrower toward the bottom of the light-modifying sheet 216, and the thickness of each light-modifying pattern 216p may be larger in the central portion than in the outer (peripheral) portion thereof.

That is, since the intensity of light emitted in the vertical direction from the light-emitting device 211 is greater than intensity of light emitted in oblique or lateral directions, the central portion of the light-modifying pattern 216p may be configured to be thicker than the other portions. However, the embodiment is not limited thereto.

By disposing the light-modifying patterns 216p on the light-emitting devices 211 as described above, it is possible to prevent or mitigate hot spots from appearing in the area in which the light-emitting devices 211 are disposed by scattering, reflecting, diffracting, or blocking at least a portion of the light emitted in the vertical direction from the light-emitting devices 211. The light-modifying sheet 216 on which the light-modifying patterns 216p are disposed may be bonded to the light source protection unit 205 via the adhesive film 215. At this time, the adhesive film 215 may be disposed in at least a portion of an area other than the area in which the light-modifying patterns 216p are disposed on the lower face of the light-modifying sheet 216.

Therefore, the adhesive film 215 may not be disposed in the area in which the light-modifying patterns 216p are disposed, and an air gap may exist between the light-modifying patterns 216p and the light source protection unit 205. In addition, the side portions of the light-modifying patterns 216p and the adhesive film 215 may be spaced apart from each other. Since the air gap exists between the light-modifying patterns 216p and the light source protection unit 205, light emitted in the lateral direction of the light-modifying patterns 216p may be reflected by the air gap through the light-modifying sheet 216 and toward the display panel 100. That is, the light emitted in the lateral direction of the light-modifying patterns 216p may be emitted at a large refraction angle by the air layer having a low refractive index, or may be reflected by the air layer. Since light reflected by the air layer is emitted after being reflected again by the reflector 212, it is possible to enhance the optical efficiency while assisting the light-modifying function of the light-modifying patterns 216p.

As described above, it is possible to enhance the optical efficiency of the backlight unit while preventing or mitigating a hot spot through the structure in which the light-modifying patterns 216p and the air gap are arranged at the positions corresponding to the light-emitting devices 211. In addition, the light-modifying patterns 216p disposed on the lower surface of the light-modifying sheet 216 may be arranged in different structures depending on the positions in which they are disposed.

Figure 5A:
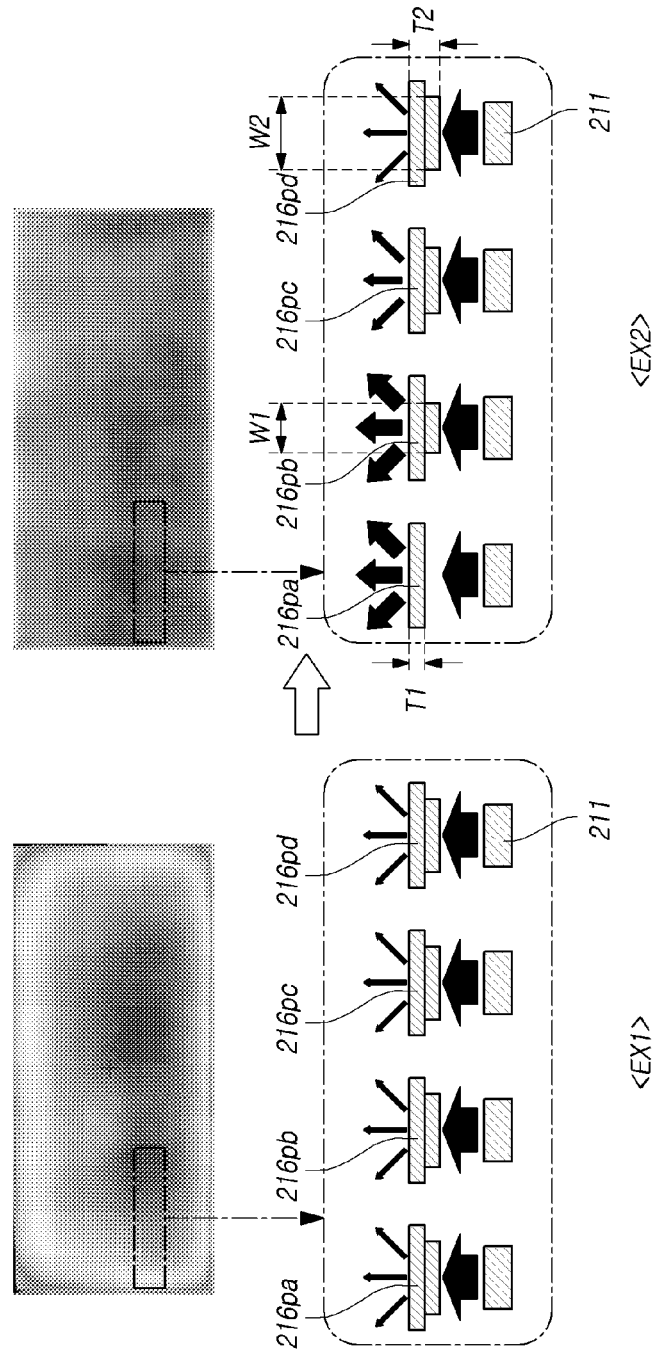
FIGS. 5A and 5B are views illustrating examples of structures according to positions of light-modifying patterns included in the backlight unit illustrated in FIG. 4.
Figure 5B:
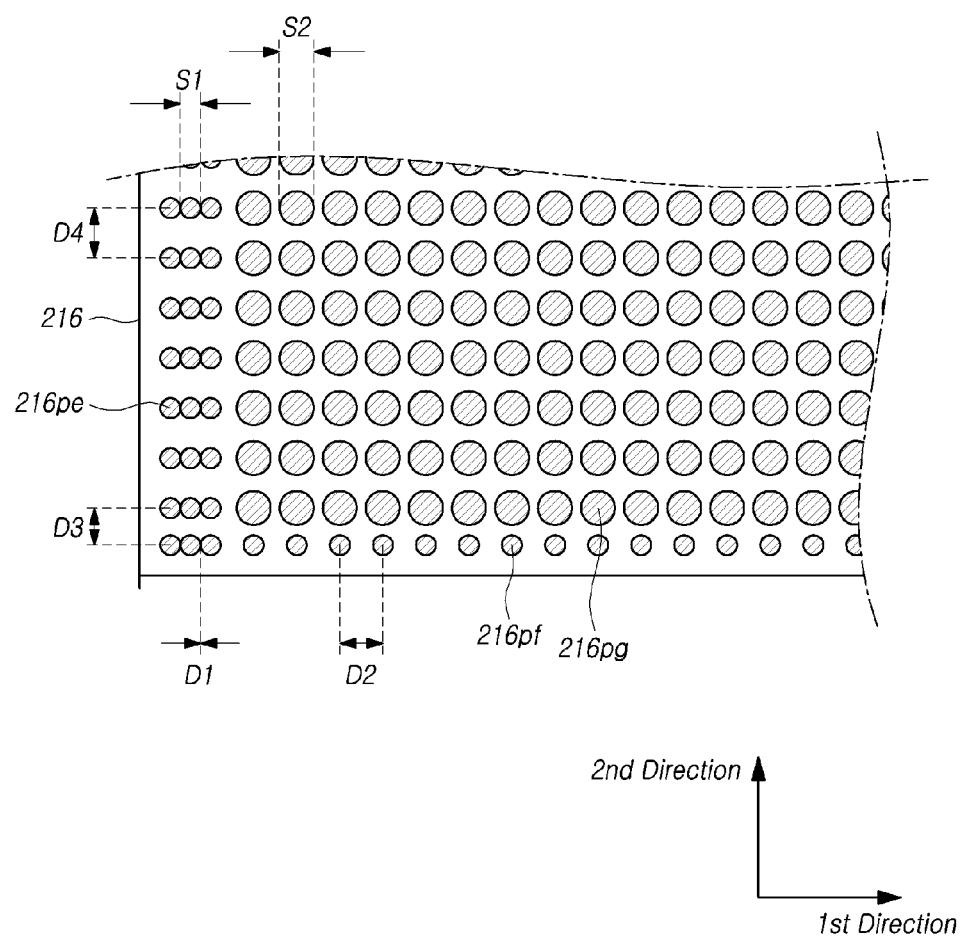

FIGS. 5A and 5B are views illustrating examples of structures according to positions of light-modifying patterns included in the backlight unit illustrated in FIG. 4.

Referring to FIG. 5A, examples of brightness appearing through the backlight unit according to the structures of light-modifying patterns 216p are illustrated, in which EX1 illustrates an example of brightness measured when the light-modifying patterns 216p are arranged in a constant structure, and EX2 represents an example of brightness measured when the light-modifying patterns 216p are arranged in different structures depending on the positions thereof.

As illustrated in EX1 in FIG. 5A, when the structures of the light-modifying patterns 216pa disposed in an outer area of the backlight unit 200 and the light-modifying patterns 216pd disposed in the central area are the same (e.g., same thickness or size), the brightness of the outer (peripheral) area of the backlight unit may be lower than the brightness of the central area of the backlight unit.

That is, since, in the outer area of the backlight unit, the number of the light-emitting devices 211 that supply light to the corresponding area is relatively small in comparison to the central area, when the light-modifying patterns 216p having the same level of light-modifying characteristic is disposed, the brightness may be lowered compared to the central area of the backlight unit.

Therefore, as illustrated in EX2 in FIG. 5A, by arranging the light-modifying patterns 216pa disposed in the outer area of the backlight unit 200 and the light-modifying patterns 216pd disposed in the central area of the backlight unit 200 to have different structures, it is possible to prevent the brightness of the outer area of the unit 200 from being deteriorated and to make the overall brightness more uniform.

As an example, the light-modifying patterns 216p may be arranged such that the thickness T1 of the light-modifying patterns 216pa disposed in the outer area of the backlight unit 200 is smaller than the thickness T2 of the light-modifying patterns 216pd disposed in the central area.

Alternatively, the light-modifying patterns 216p may be arranged such that the area W1 of the thickest portion in the light-modifying pattern 216pb disposed adjacent to the outer area of the backlight unit is smaller than the area W2 of the thickest portion in the light-modifying pattern 216pd. That is, in the light-modifying patterns 216pa and 216pb disposed in the outer area of the backlight unit 200 or in the area adjacent to the outer area, the area of the portion having a higher blocking characteristic be made smaller.

In addition, the light-modifying patterns 216p may be arranged such that the thicknesses of the light-modifying patterns 216p gradually decrease from the central area toward the outer area of the backlight unit 200, or such that the area of the thickest portions of the light-modifying patterns 216p gradually decrease. That is, for the light-modifying patterns 216pa and 216pb disposed in the outer area or adjacent to the outer area of the backlight unit 200, the area of the portion having the high blocking characteristic be made smaller.

In addition, the thickness of the light-modifying patterns 216p gradually decreases from the central area of the backlight unit 200 to the outer area, or the area of the thickest part of the light-modifying patterns 216p gradually decreases.

In addition, in some cases, the light-modifying patterns 216p may be differently arranged such that the number or intervals of light-emitting devices 211 are different between the central area and the outer area of the backlight unit 200.

Referring to FIG. 5B, another example of the structure in which the light-modifying patterns 216p are disposed on the lower surface of the light-modifying sheet 216 is illustrated.

Here, the distance between the light-emitting devices 211 disposed in the outer area of the backlight unit 200 may be smaller than the distance between the light-emitting devices 211 disposed in the central area of the backlight unit 200. That is, the light-emitting devices 211 may be arranged in the structure in which the light-emitting devices 211 are disposed more densely in the outer area of the backlight unit 200 such that the brightness becomes uniform in the central area and the outer area of the backlight unit 200.

In addition, since the light-modifying patterns 216p disposed on the lower face of the light-modifying sheet 216 are arranged to correspond to the light-emitting devices 211, the interval between the light-modifying patterns 216p disposed in the outer area of the backlight unit 200 may be different from the interval between the light-modifying patterns 216p disposed in the central area.

As an example, the interval D1 in the first direction of the light-modifying patterns 216p disposed in the outer area of the backlight unit 200 may be smaller than the interval D2 in the first direction of the light-modifying patterns 216p disposed in the central area. In addition, the interval D3 in the second direction of the light-modifying patterns 216p disposed in the outer area of the backlight unit 200 may be smaller than the interval D4 in the second direction of the light-modifying patterns 216p disposed in the central area.

The size, thickness, and the like of the light-modifying patterns 216p disposed in the outer area of the backlight unit may be different from the size, thickness, and the like of the light-modifying patterns 216p disposed in the central area of the backlight unit.

For example, as illustrated in FIG. 5B, the size S1 of the light-modifying patterns 216pe and 216pf disposed in the outer area of the backlight unit 200 may be smaller than the size S2 of the light-modifying patterns 216pg disposed in the central area of the backlight unit 200.

Alternatively, the light-modifying pattern 216p may have a multilayer structure as described above. In this case, the thickness of the light-modifying patterns 216pe and 216pf disposed in the outer area of the backlight unit or the area of the portions having the largest thickness in the light-modifying patterns 216pe and 216pf may be smaller than the thickness of the light-modifying patterns 216pg disposed in the central area of the backlight unit 200 or the area of the portions having the largest thickness in the light-modifying patterns 216pg.

That is, by reducing the sizes of the light-modifying patterns 216pe and 216pf disposed in the outer area of the backlight unit, the light-modifying patterns 216pe and 216pf may be disposed to correspond to the light-emitting devices 211 arranged at a small interval. As a result, it is possible to prevent or mitigate hot spots from being generated at the positions corresponding to the light-emitting devices 211 in the outer area of the backlight unit 200.

In addition, by lowering the level at which the light emitted from the light-emitting devices 211 is scattered, reflected, diffracted, or blocked in the outer area of the backlight unit 200, the amount of light to be emitted is increased and the brightness of the outer area of the backlight unit 200 is improved. Thus, it is possible to make the entire area of the backlight unit 200 exhibit more uniform brightness.

As described above, by arranging the light-modifying patterns 216p to have different structures from area to area in the backlight unit 200, it is possible to prevent or mitigate the brightness from being lowered in the outer area of the backlight unit 200 and to improve the uniformity of brightness.

In addition, it is possible to prevent or mitigate hot spots of the backlight unit 200 and to improve the uniformity of brightness through the structure in which the above-described modifying patterns 216p are disposed.

Embodiments are also able to provide a method of improving the image quality of the backlight unit 200 while increasing the optical efficiency of the backlight unit by diffracting light emitted in the vertical direction of the light-emitting devices 216p.

Figure 6:
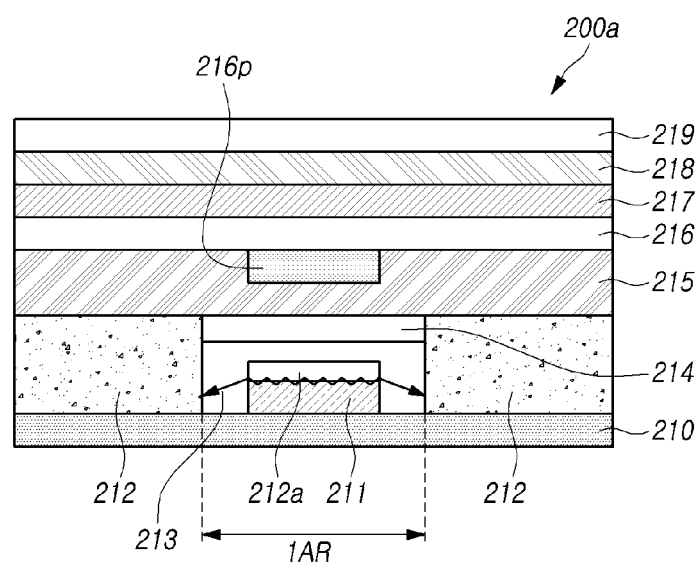
FIG. 6 is a structural view illustrating an embodiment of a backlight unit illustrated in FIG. 1.
Figure 7:
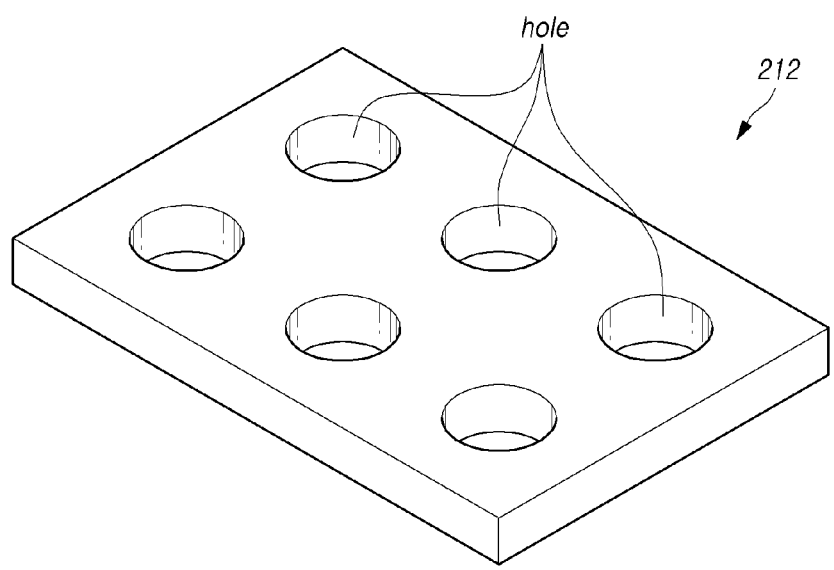
FIG. 7 is a perspective view illustrating a reflector employed in the backlight unit illustrated in FIG. 1.

FIG. 6 is a structural view illustrating an embodiment of the backlight unit illustrated in FIG. 1, and FIG. 7 is a perspective view illustrating a reflector employed in the backlight unit illustrated in FIG. 1.

Referring to FIGS. 6 and 7, a backlight unit 200a may include a substrate 210, a light-emitting device 211 disposed on the substrate 210 having a flip chip structure, a reflector 212 disposed to surround the light-emitting device 211 and a first area 1AR including the periphery of the light-emitting device, a color resin 213 disposed in the first area 1AR, an adhesive film 215 disposed above the color resin 213 to be spaced apart from the color resin 213 by a predetermined distance, and a light-modifying sheet 216 disposed on the adhesive film 215 and having a light-modifying pattern 216p disposed to correspond to the position of the light-emitting device 211.

The light-emitting device 211 may have a flip chip structure. The light-emitting device 211 may emit blue light. However, the color of the light emitted by the light-emitting device 211 is not limited thereto. The light-emitting device 211 may be disposed in the center of the first area 1AR on the substrate 210.

The reflector 212 may reflect the light emitted from the light-emitting device 211. The reflector 212 may be disposed on the substrate 210. The reflector 212 may include a hole corresponding to the first area 1AR as illustrated in FIG. 3. When the reflector 212 is disposed on the substrate 210, the first area 1AR on the substrate 210 may be exposed to correspond to the hole. In addition, the substrate 210 may reflect light. The substrate 210 may include a reflective material. The substrate 210 and the reflector 212 may be coated with a white pigment to reflect light. The white pigment may include a photo solder resist (PSR). However, the present disclosure is not limited thereto. Here, the shape of the hole corresponding to the first area 1AR is illustrated as being circular, but it is not limited thereto.

The color resin 213 may be disposed in the first area 1AR. The color resin 213 may be disposed only in the first area 1AR due to the hole. The color resin 213 may be cured by ultraviolet rays. After the color resin 213 is disposed in the first area 1AR, the color resin 213 may be cured using ultraviolet rays. The color resin 213 may include a red phosphor. Light passing through the color resin 213 may be purple. However, the present disclosure is not limited thereto. Since the color resin 213 is disposed only in the first area 1AR, it is possible to reduce the used amount of the phosphor, thereby reducing a manufacturing cost.

The adhesive film 215 may be disposed on the color resin 213. The adhesive film 215 may include a resin. The refractive index of the adhesive film 215 may be the same as or similar to the refractive index of the color resin 213. However, the present disclosure is not limited thereto. The adhesive film 215 may be disposed to be spaced apart from the color resin 213 by a predetermined distance. That is, a light path modulator 214 having a refractive index different from that of the color resin 213 may be disposed between the adhesive film 215 and the color resin 213. The light path modulator 214 and the color resin 213 may be in contact with each other so that light can experience total internal reflection at the boundary between the light path modulator 214 and the color resin 213. The angle at which light is totally reflected may correspond to a difference in refractive index between the light path modulator 214 and the color resin 213. The light path modulator 214 may be one or more materials having a refractive index ranging from 1 to 1.46. The light path modulator 214 may be air. However, the present disclosure is not limited thereto.

The light-modifying sheet 216 may include a light-modifying pattern 216p. The light-modifying sheet 216 may be disposed on the adhesive film 215 such that the light-modifying pattern 216p is disposed at a position corresponding to the light-emitting device 211. It is possible to prevent a hot spot from being generated by scattering, reflecting, diffracting, or blocking light emitted in the vertical direction from the light-emitting device by the light-modifying pattern 216p. The light-modifying pattern 216p may reflect incident light.

A phosphor film 217 may be disposed on the light-modifying sheet 216. The color of a phosphor included in the phosphor film 217 may be different from the color of the phosphor included in the color resin 213. A diffusion plate 218 may be disposed on the phosphor film 217, and an optical sheet 219 may be disposed on the diffusion plate 218. The number of optical sheets 219 is illustrated as one, but is not limited thereto.

In an embodiment, a reflector 212a may be further disposed above the light-emitting device 211. The reflector 212a disposed above the light-emitting device 211 may be a distributed Bragg reflector. However, the present disclosure is not limited thereto. Light emitted from the light-emitting device 211 and having a path in the vertical direction or in a direction close to the vertical direction may be reflected by the reflector 212a.

Figure 8:
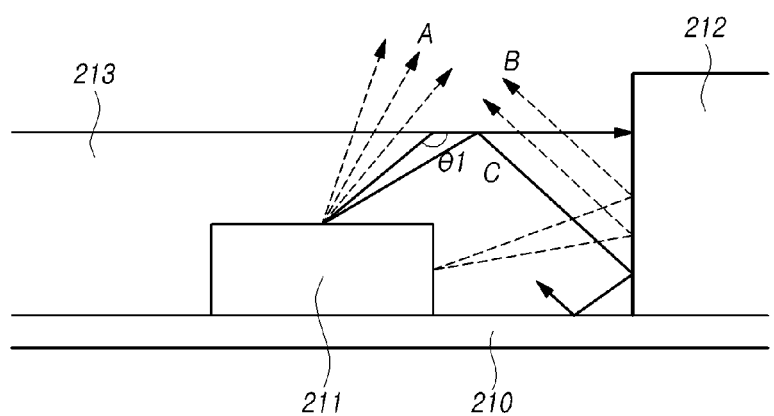
FIG. 8 is a conceptual view illustrating paths of light emitted from a light-emitting device.

FIG. 8 is a conceptual view illustrating paths of light emitted from a light-emitting device.

Referring to FIG. 8, the light-emitting device 211 may be disposed in the color resin 213. Therefore, when the light emitted from the light-emitting device 211 passes through the color resin 213, the light emitted from the light-emitting device 211 may be excited to have energy corresponding to the color mixed with the color of the phosphor included in the color resin 213. For example, when the light-emitting device 211 emits blue light and the color resin 213 includes a red phosphor, the light passing through the color resin 213 may have a purple color. However, there may be a difference in the degree of color mixture depending on the path of the light. For example, since the thickness of the color resin 213, through which the light beams of a first group A pass among light beams emitted from the light-emitting device 211, is small, colors are not sufficiently mixed. However, among the light beams emitted from the light-emitting device 211, the light beams corresponding to a second group B pass through the color resin 213 and are reflected by the reflector 212. Then, the light beams pass through the color resin 213 again and then proceed toward the display panel 100. Accordingly, the light beams of the first group A and the light beams of the second group B may differ in color reproductivity. In addition, there arises a problem in that the color reproductivity of the backlight unit 200a is deteriorated by the light beams of the first group A.

In order to solve the above problems, when at least some of the light beams among the light beams of the first group A experience total internal reflection at the boundary of the color resin 213 such that the paths thereof are changed, the light beams emitted from the light-emitting device 211 may be included in a third group C. The light beams of the third group C are reflected at the upper boundary of the color resin 213, then directed to the color resin 213 toward the reflector 212 (or substrate 210), and then reflected by the reflector 212 (or substrate 210) to be radiated toward the display panel 100. This may make it possible to enhance the color reproductivity of the backlight unit 200a.

In order to make total internal reflection occur at the boundary of the color resin 213, a material (e.g., the light path modulator 214 shown in FIG. 6) having a refractive index different from that of the color resin 213 may be disposed on the color resin 213. In addition, it is also possible to increase the angle 81 at which the total internal reflection occurs at the boundary of the color resin 213 by setting a large difference in refractive index between the color resin 213 and the material disposed on the color resin 213, which makes it possible to increase the amount of light experiencing total internal reflection at the boundary of the light source 213.

FIGS. 9A to 9F are conceptual views illustrating a procedure of manufacturing the backlight unit illustrated in FIG. 6.

Figure 9A:
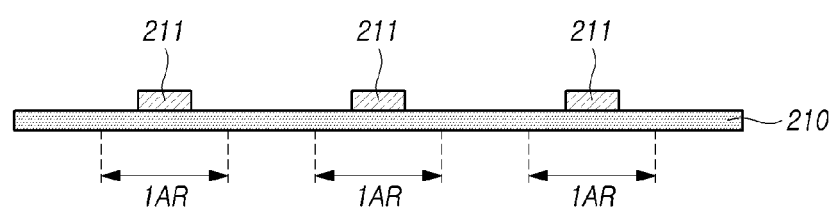
FIGS. 9A, 9B, 9C, 9D, 9E, and 9F are conceptual views illustrating a procedure of manufacturing the backlight unit illustrated in FIG. 6.

As illustrated in FIG. 9A, in the backlight unit 200a, light-emitting devices 211 may be disposed on the substrate 210. Each light-emitting device 211 may have a flip chip structure directly connected to the substrate 210. The light-emitting devices 211 may be arranged to correspond to first areas 1AR on the substrate 210. Each light-emitting device 211 may be disposed in the center of one of the first areas 1AR. Here, although the number of the light-emitting devices 211 disposed on the substrate 210 is illustrated as three, the present disclosure is not limited thereto. The substrate 210 may include a reflective material so as to reflect light. Further, the substrate 210 may be coated with a white pigment. In addition, each light-emitting device 211 may be further provided with a reflector 212a thereon, as illustrated in FIG. 6. The reflector 212a disposed on the light-emitting device 211 may be a distributed Bragg reflector.

Figure 9B:
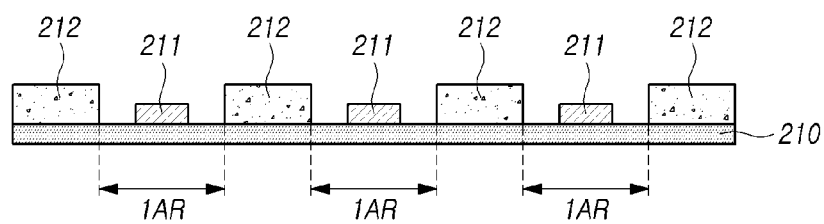

As illustrated in FIG. 9B, a reflector 212 may be disposed on the substrate 210. The reflector 212 may include holes having a predetermined diameter, and the holes may correspond to the first areas 1AR. Therefore, the first areas 1AR on the substrate 210 may not be covered by the reflector 212.

Figure 9C:
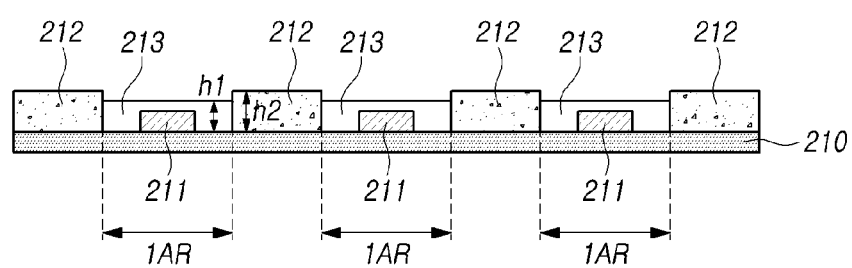

In addition, as illustrated in FIG. 9C, the color resin 213 is put into the first areas 1AR corresponding to the holes of the reflector 212, and is cured by ultraviolet rays. The upper face of the color resin 213 may be disposed below the upper face of the reflector 212. That is, the height h2 of the reflector 212 may be higher than the height h1 of the color resin 213. Here, although the upper face of the color resin 213 is shown as being parallel to the horizontal surface, the present disclosure is not limited thereto and the upper face of the color resin 213 may be concave or convex. However, the highest point of the upper face of the color resin 213 is lower than the height of the reflector 212.

Figure 9D:
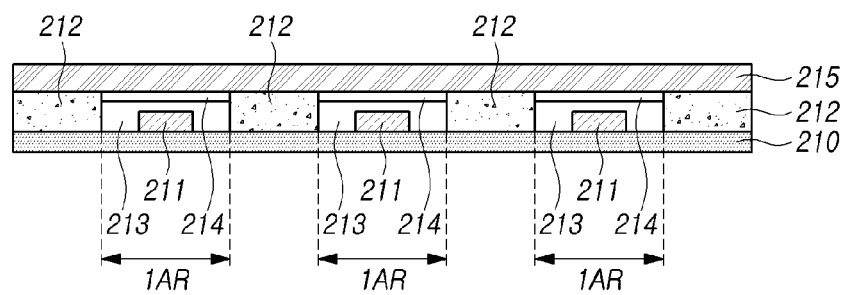

Then, as illustrated in FIG. 9D, the adhesive film 215 may be disposed above the substrate 210 on which the reflector 212 is disposed. Since the height of the reflector 212 is higher than the height of the color resin 213, the adhesive film 215 may be disposed such that the adhesive film 215 is disposed above the color resin 213 to form a predetermined gap above the color resin 213. A predetermined material 214 may be disposed in the predetermined gap. The light path modulator 214 may be air. However, the light path modulator 214 is not limited thereto, and may be any material as long as the material has a refractive index different from that of the color resin 213. The adhesive film 215 may be a light-transmissive material.

Figure 9E:
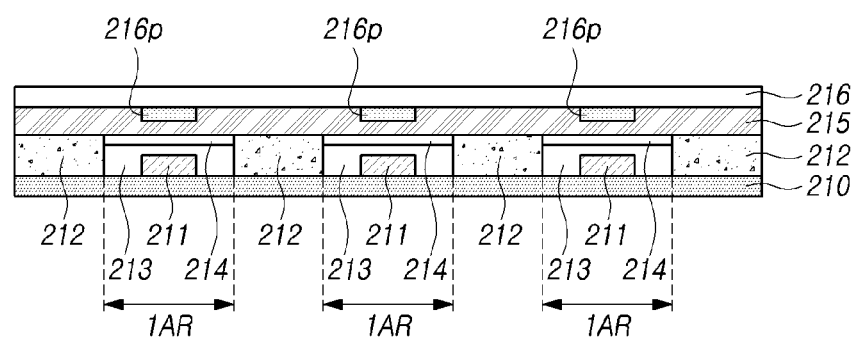

In addition, as illustrated in FIG. 9E, a light-modifying sheet 216 may be disposed on the adhesive film 215. The light-modifying sheet 216 may include light-modifying patterns 216p, and the light-modifying patterns 216p may be disposed at positions corresponding to the positions at which the light-emitting devices 211 are disposed. The light-modifying patterns 216p included in the light-modifying sheet 216 are capable of reflecting, scattering, diffracting, or blocking the light emitted in the vertical direction or at an angle close to the vertical direction from the light-emitting devices 211, thereby preventing or mitigating hot spots from being generated in the backlight unit 200 illustrated in FIG. 1.

Figure 9F:
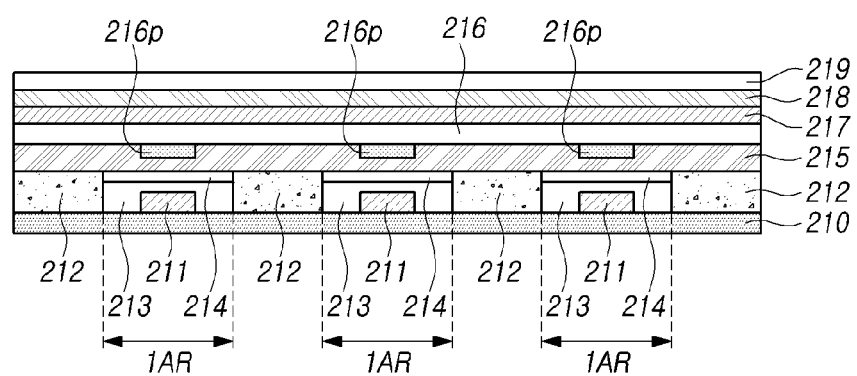

In addition, as illustrated in FIG. 9F, a phosphor film 217 may be disposed on the light-modifying sheet 216. The phosphor film 217 may include a phosphor having a color different from that of the color resin. A diffusion plate 218 may be disposed on the phosphor film 217, and an optical sheet 219 may be disposed on the diffusion plate 218.

Figure 10:
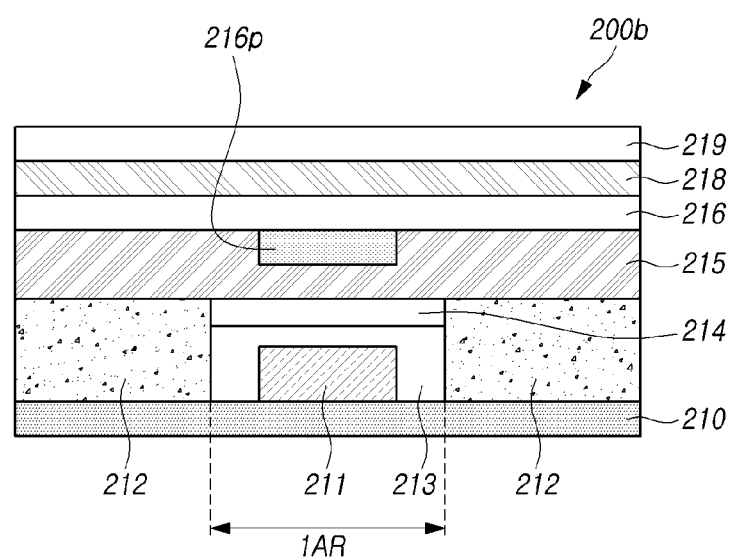
FIG. 10 is a structural view illustrating an embodiment of the backlight unit illustrated in FIG. 1.

FIG. 10 is a structural view illustrating an embodiment of the backlight unit illustrated in FIG. 1.

Referring to FIG. 10, a backlight unit 200b may include a substrate 210, a light-emitting device 211 disposed on the substrate 210 having a flip chip structure, a reflector 212 disposed to surround the light-emitting device 211 and a first area 1AR including the periphery of the light-emitting device, a color resin 213 disposed in the first area 1AR, an adhesive film 215 disposed to be spaced apart from the color resin 213 by a predetermined distance, and a light-modifying sheet 216 disposed on the adhesive film 215 and having a light-modifying pattern 216p disposed to correspond to the position of the light-emitting device 211.

The light-emitting device 211 may emit blue light. However, the present disclosure is not limited thereto. The light-emitting device 211 may be disposed in the center of the first area 1AR on the substrate 210.

The reflector 212 may reflect the light emitted from the light-emitting device 211. The reflector 212 may be disposed on the substrate 210. The reflector 212 may be the same as the reflector 212 illustrated in FIG. 3, and may include a hole corresponding to the first area 1AR. When the reflector 212 is disposed on the substrate 210, the first region 1AR on the substrate 210 may be exposed to correspond to the hole. The reflector 212 may be coated with a white pigment to reflect light. The white pigment may include a photo solder resist (PSR). However, the present disclosure is not limited thereto. Here, the shape of the hole corresponding to the first area 1AR is illustrated as being circular, but it is not limited thereto.

The color resin 213 may be disposed in the first area 1AR. The color resin 213 may be disposed only in the first area 1AR due to the hole (and in other areas exposed by other holes formed by the reflector 212). The color resin 213 may be cured by ultraviolet rays. After the color resin 213 is disposed in the first area 1AR, the color resin 213 may be cured using ultraviolet rays. The color resin 213 may include a yellow phosphor. In addition, the color resin 213 may include a red phosphor and a green phosphor. Light passing through the color resin 213 may be purple. However, the present disclosure is not limited thereto. Since the color resin 213 is disposed only in the first area 1AR (instead of a larger area on the substrate 210), it is possible to reduce the used amount of the phosphor, thereby reducing a manufacturing cost.

The adhesive film 215 may be disposed on the color resin 213. The adhesive film 215 may include a resin. The refractive index of the adhesive film 215 may be the same as or similar to the refractive index of the color resin 213. However, the present disclosure is not limited thereto. The adhesive film 215a may be an OCA film. The adhesive film 215 may be disposed to be spaced apart from the color resin 213 by a predetermined distance. That is, an light path modulator 214 having a refractive index different from that of the color resin 213 may be disposed between the adhesive film 215 and the color resin 213. The light path modulator 214 and the color resin 213 may be in contact with each other so that light can experience total internal reflection at the boundary between the light path modulator 214 and the color resin 213. The angle at which light experiences total internal reflection may correspond to a difference in refractive index between the light path modulator 214 and the color resin 213. The light path modulator 214 may be air. However, the present disclosure is not limited thereto.

The light-modifying sheet 216 may include a light-modifying pattern 216p. The light-modifying sheet 216 may be disposed on the adhesive film 215 such that the light-modifying pattern 216p is disposed at a position corresponding to the light-emitting device 211. It is possible to prevent or mitigate a hot spot from being generated in the backlight unit 200b by reflecting, scattering, diffracting, or blocking light emitted from the light-emitting device and having a path in the vertical direction or a path close to the vertical direction by the light-modifying pattern 216p. The light-modifying pattern 216b may have the same shape as the light-modifying pattern illustrated in FIG. 4.

A diffusion plate 218 may be disposed on the light-modifying sheet 216, and an optical sheet 219 may be disposed on the diffusion plate 218. The number of optical sheets 219 is illustrated as one, but is not limited thereto.

Therefore, the color resin 213 may include two phosphors having different colors or may include a phosphor having two colors, so that the backlight unit may not include the phosphor film 217 above the light-modifying sheet, unlike the backlight unit illustrated in FIG. 2. This makes it possible to reduce the amount of the phosphor used in the backlight unit 200, thereby reducing a manufacturing cost.

Figure 11:
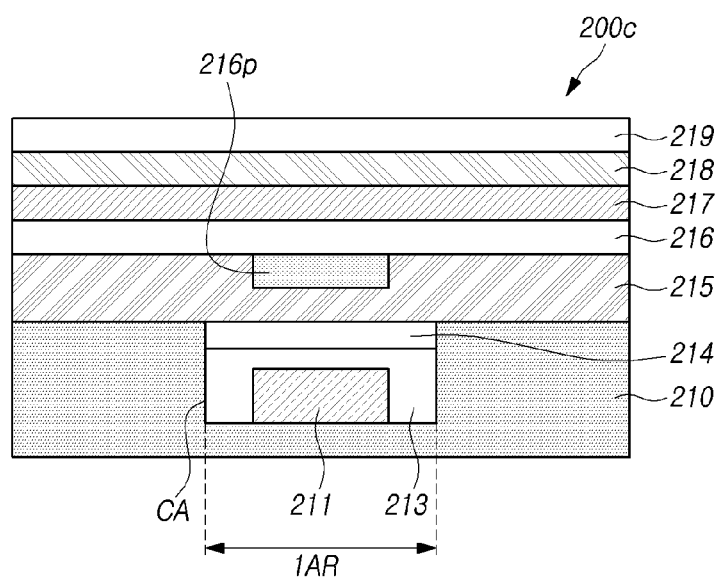
FIG. 11 is a structural view illustrating an embodiment of the backlight unit illustrated in FIG. 1.

FIG. 11 is a structural view illustrating an embodiment of the backlight unit illustrated in FIG. 1.

Referring to FIG. 11, a backlight unit 200c may include a substrate 210, a light-emitting device 211 disposed on the substrate 210 having a flip chip structure, a reflector 212 disposed to surround the light-emitting device 211 and a first area 1AR including the periphery of the light-emitting device, a color resin 213 disposed in the first area 1AR, an adhesive film 215 disposed above the color resin 213 to be spaced apart from the color resin 213 by a predetermined distance, and a light-modifying sheet 216 disposed on the adhesive film 215 and having a light-modifying pattern 216p disposed to correspond to the position of the light-emitting device 211.

The light-emitting device 211 may have a flip chip structure. In the flip chip structure, the light-emitting device 211 is directly disposed on the substrate 210 rather than being mounted in a package, thereby making it possible to manufacture a light source that is light in weight and has a large radiation angle. The light-emitting device 211 may emit blue light. However, the present disclosure is not limited thereto. The light-emitting device 211 may be disposed in the center of the first area 1AR on the substrate 210.

A groove CA corresponding to the first region 1AR may be disposed in the substrate 210. The light-emitting device 211 may be disposed in the groove CA. The outer wall of the groove CA may serve as a reflector. In order to make the outer wall of the groove CA serve as a reflector, a white pigment may be applied to the substrate 210. That is, the reflector may include the substrate 210 and the white pigment applied to the substrate. The white pigment may include a photo solder resist (PSR). However, the present disclosure is not limited thereto. Here, the shape of the groove CA corresponding to the first area 1AR may be circular, but it is not limited thereto.

The color resin 213 may be disposed in the first area 1AR. The color resin 213 may be disposed only in the first area 1AR due to the groove CA (and in other areas exposed by other grooves of the substrate 210). The color resin 213 may be cured by ultraviolet rays. After the color resin 213 is disposed in the first area 1AR, the color resin 213 may be cured using ultraviolet rays. The color resin 213 may include a red phosphor. However, the color resin 213 is not limited thereto, and may include a yellow phosphor. In addition, the color resin 213 may include a red phosphor and a green phosphor. Light passing through the color resin 213 may be purple. However, the present disclosure is not limited thereto. Since the color resin 213 is disposed only in the first area 1AR, it is possible to reduce the used amount of the phosphor.

The adhesive film 215 may be disposed on the color resin 213. The adhesive film 215 may include a resin. The refractive index of the adhesive film 215 may be the same as or similar to the refractive index of the color resin 213. However, the present disclosure is not limited thereto. The adhesive film 215 may be an OCA film. The adhesive film 215 may be disposed to be spaced apart from the color resin 213 by a predetermined distance. That is, an light path modulator 214 having a refractive index different from that of the color resin 213 may be disposed between the adhesive film 215 and the color resin 213. The light path modulator 214 and the color resin 213 may be in contact with each other so that light can experience total internal reflection at the boundary between the light path modulator 214 and the color resin 213. The angle at which light experiences total internal reflection may correspond to a difference in refractive index between the light path modulator 214 and the color resin 213. The light path modulator 214 may be one or more materials having a refractive index ranging from 1 to 1.46. The light path modulator may be air. However, the present disclosure is not limited thereto.

The light-modifying sheet 216 may include a light-modifying pattern 216p. The light-modifying sheet 216 may be disposed on the adhesive film 215 such that the light-modifying pattern 216p is disposed at a position corresponding to the light-emitting device 211. It is possible to prevent or mitigate a hot spot from being generated in the backlight unit 200c by reflecting, scattering, diffracting, or blocking light emitted from the light-emitting device and having a path in the vertical direction or a path close to the vertical direction by the light-modifying pattern 216p. The light-modifying pattern 216b may have the same shape as the light-modifying pattern illustrated in FIG. 4. However, the present disclosure is not limited thereto.

A phosphor film 217 may be disposed on the light-modifying sheet 216. The phosphor film 217 may include a green phosphor. However, the present disclosure is not limited thereto. In addition, when the color resin 213 includes a yellow phosphor or a red phosphor and a green phosphor, the phosphor film 217 may not be disposed on the light-modifying sheet 216.

A diffusion plate 218 may be disposed on the light-modifying sheet 216 or the phosphor film 217, and an optical sheet 219 may be disposed on the diffusion plate 218. The number of optical sheets 219 is illustrated as one, but is not limited thereto.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. A backlight unit comprising:
   a substrate;
   a light-emitting device on the substrate;
   a lower reflector on the substrate, the lower reflector with a hole that accommodates and exposes the light-emitting device, the lower reflector having a height greater than a height of the light-emitting device and configured to reflect light emitted from the light-emitting device;
   a color resin in the hole and on the light-emitting device, and having a height lower than the height of the lower reflector;
   a light path modulator above the light-emitting light emitting device and on the color resin, the light path modulator having a different refractive index than a refractive index of the color resin to reflect the emitted light at a boundary of the light path modulator and the color resin towards the lower reflector;
   an adhesive film on the lower reflector and the light path modulator; and
   a light-modifying sheet on the adhesive film, the light-modifying sheet including a plurality of light-modifying patterns,
   wherein the light path modulator overlaps with at least one of the plurality of light-modifying patterns, and
   wherein the light path modulator is located within the hole and surrounded by the color resin, the lower reflector, and the adhesive film.

2. The backlight unit of claim 1, wherein the color resin includes a plurality of phosphors having at least two different colors.

3. The backlight unit of claim 1, wherein the color resin has an upper surface that is concave or convex.

4. The backlight unit of claim 1, wherein the light path modulator comprises air.

5. The backlight unit of claim 1, further comprising:
   a distributed Bragg reflector on the light-emitting device, the distributed Bragg reflector in the hole and between the substrate and the light path modulator.

6. The backlight unit of claim 1,
   wherein the plurality of light-modifying patterns at least partially overlap the light-emitting device, the plurality of light-modifying patterns having one or more layers including a top layer on a surface of the light-modifying sheet facing the substrate, air gaps present between the one or more layers and the adhesive film.

7. The backlight unit of claim 6, wherein the one or more layers further includes:
   a middle layer on a surface of the top layer facing the substrate, the top layer having a size greater than a size of the middle layer.

8. The backlight unit of claim 7, wherein the one or more layers further includes:
   a bottom layer on a surface of the middle layer facing the substrate, the bottom layer having a size less than the size of the middle layer.

9. The backlight unit of claim 6, further comprising:
   a phosphor film on the light-modifying sheet;
   a diffusion plate on the phosphor film; and
   an optical sheet on the diffusion plate.

10. The backlight unit of claim 1, wherein a width of the light path modulator has a same size as a width of the hole, and a height of the light path modulator has a size resulting from subtracting a height of the color resin from a height of the hole.

11. A backlight unit comprising:
    a substrate including a groove having side walls applied with a reflective material and having a first height;
    a light-emitting device in the groove and having a second height lower than the first height;
    a color resin in the groove and on the light-emitting device, the color resin having a third height lower than the first height;
    a light path modulator in the groove and on the color resin, the light path modulator having a refractive index different from a refractive index of the color resin to reflect light emitted from the light-emitting device at a boundary of the light path modulator and the color resin towards the side walls of the grooves;
    an adhesive film on the light path modulator; and
    a light-modifying sheet on the adhesive film, the light-modifying sheet including a plurality of light-modifying patterns,
    wherein the light path modulator overlaps with at least one of the plurality of light-modifying patterns, and
    wherein the light path modulator is located within the groove and surrounded by the color resin, the side walls, and the adhesive film.

12. The backlight unit of claim 11, wherein the color resin includes a plurality of phosphors having at least two different colors.

13. The backlight unit of claim 11, wherein the color resin has an upper surface that is concave or convex.

14. The backlight unit of claim 11, wherein the light path modulator comprises air.

15. The backlight unit of claim 11, further comprising:
    a distributed Bragg reflector on the light-emitting device, the distributed Bragg reflector in the groove and between the substrate and the light path modulator.

16. A method for manufacturing a backlight unit, the method comprising:
    disposing a plurality of light-emitting devices in areas of a substrate;
    disposing a lower reflector on the substrate with holes of the lower reflector accommodating and exposing the plurality of light-emitting devices, the holes having a depth greater than a height of the plurality of light-emitting devices;
    curing a color resin in the holes, the cured resin having a height lower than the depth;
    disposing a light path modulator in the holes and on the color resin, the light path modulator having a different refractive index than that of the color resin;
    disposing an adhesive film on the lower reflector and the light path modulator; and
    disposing a light-modifying sheet on the adhesive film, the light-modifying sheet including a plurality of light-modifying patterns,
    wherein the light path modulator overlaps with at least one of the plurality of light-modifying patterns, and
    wherein the light path modulator is located within at least one of the holes and surrounded by the color resin, the lower reflector, and the adhesive film.

17. The method of claim 16, further comprising:
    disposing reflectors on the plurality of light-emitting devices; and
    coating the substrate with a reflective material.

18. The method of claim 16,
    wherein the plurality of light-modifying patterns at least partially overlap the plurality of light-emitting devices, the plurality of light-modifying patterns having one or more layers including a top layer on a surface of the light-modifying sheet facing the substrate, air gaps present between the one or more layers and the adhesive film.

19. The method of claim 18, further comprising:
printing the top layer on the surface of the light-modifying sheet.

20. The method of claim 19, further comprising:
printing a middle layer of the one or more layers on the top layer, the top layer having an area greater than an area of the middle layer, wherein the light-modifying sheet having the printed top layer and middle layer is reversed before disposing the light-modifying sheet on the adhesive film.

21. The method of claim 20, further comprising:
printing a bottom layer of the one or more layers on the middle layer, the bottom layer having an area less than the area of the middle layer.

22. A backlight unit comprising:
a light-emitting device having a flip chip structure;
a first reflector disposed to surround a first area including the light-emitting device and a periphery of the light-emitting device;
a color resin disposed in the first area;
an adhesive film disposed above the color resin to be spaced apart from the color resin by a predetermined distance;
a light path modulator above the light-emitting device and on the color resin; and
a light modifying sheet disposed on the adhesive film and including a light modifying pattern disposed to correspond to a position of the light-emitting device,
wherein the adhesive film is on the light path modulator,
wherein the light path modulator overlaps with the light-modifying pattern, and
wherein the light path modulator is located within a hole in the first area and surrounded by the color resin, the first reflector, and the adhesive film.

23. The backlight unit of claim 22, further comprising:
a material disposed between the adhesive film and the color resin and having a refractive index different from a refractive index of the color resin.

24. The backlight unit of claim 22, wherein the first reflector has a height higher than a height of the color resin.

25. The backlight unit of claim 22, further comprising a substrate including a groove corresponding to the first area, and wherein a reflective film is applied to the substrate.

26. The backlight unit of claim 22, further comprising:
a phosphor film disposed above the light modifying sheet and including a phosphor having a color different from a color of the color resin.

27. The backlight unit of claim 22, wherein the color resin comprises two types of phosphors having different colors.

28. The backlight unit of claim 22, further comprising:
a second reflector disposed on an upper face of the light-emitting device.

29. A display device comprising:
a display panel;
a backlight unit disposed below the display panel and configured to radiate light to the display panel,
wherein the backlight unit comprises:
a light-emitting device having a flip chip structure;
a first reflector disposed to surround a first area including the light-emitting device and a periphery of the light-emitting device;
a color resin disposed in the first area;
an adhesive film disposed above the color resin to be spaced apart from the color resin by a predetermined distance;
a light path modulator above the light-emitting device and on the color resin; and
a light modifying sheet disposed on the adhesive film and including a light modifying pattern disposed to correspond to a position of the light-emitting device,
wherein the adhesive film is on the light path modulator,
wherein the light path modulator overlaps with the light modifying pattern, and
wherein the light path modulator is located within a hole in the first area and surrounded by the color resin, the first reflector, and the adhesive film.

30. The display device of claim 29, further comprising:
a material disposed between the adhesive film and the color resin and having a refractive index different from a refractive index of the color resin.

31. The display device of claim 29, wherein the first reflector has a height higher than a height of the color resin.

32. The display device of claim 29, wherein the backlight unit further comprises a substrate including a groove corresponding to the first area, and wherein a reflective film is applied to the substrate.

33. The display device of claim 29, further comprising:
a phosphor film disposed above the light modifying sheet and including a phosphor having a color different from a color of the color resin.

34. The display device of claim 29, wherein the color resin comprises two types of phosphors having different colors.

35. The display device of claim 29, further comprising:
a second reflector disposed on an upper face of the light-emitting device.

* * * * *